Patented June 10, 1924.

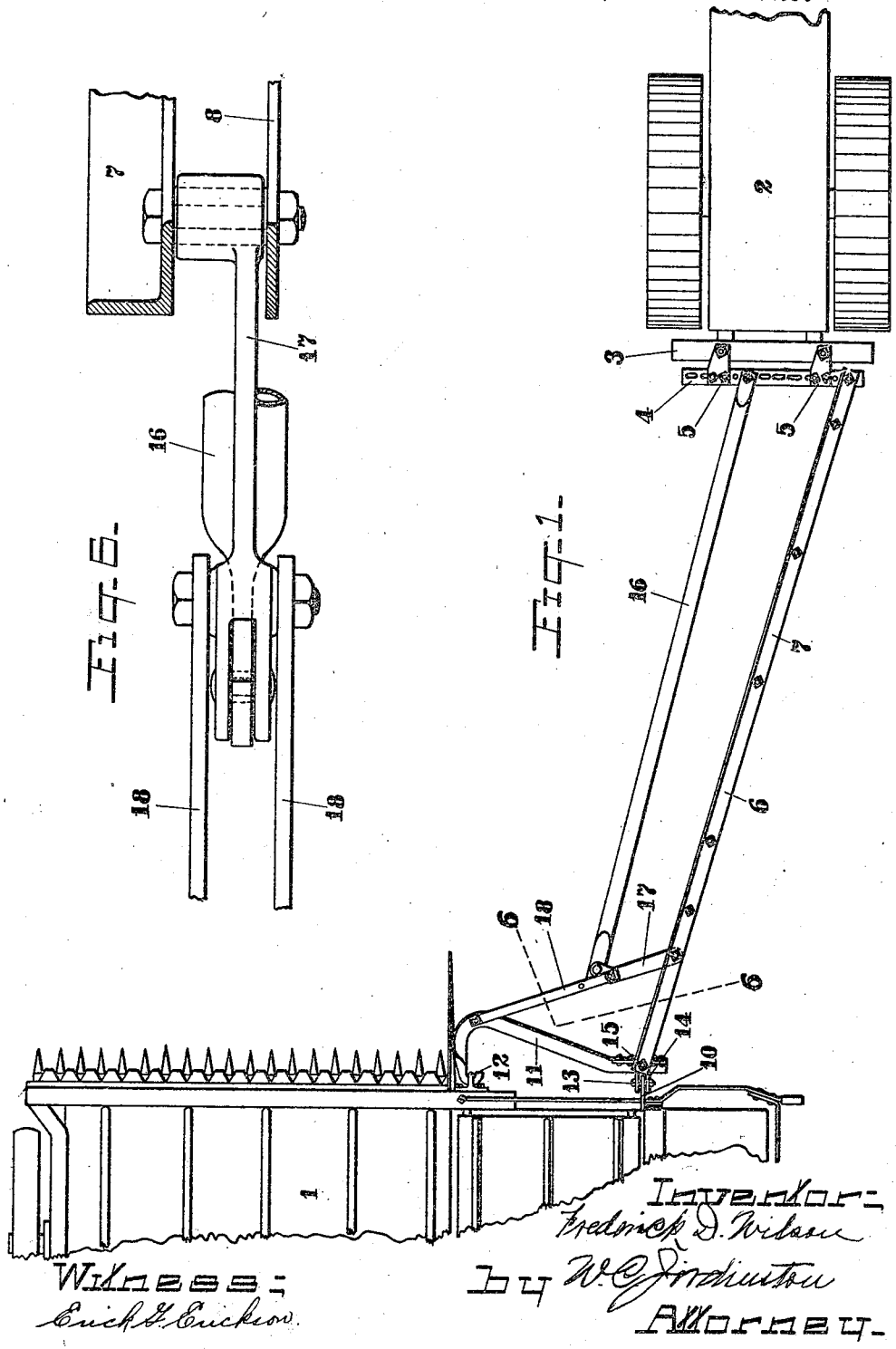

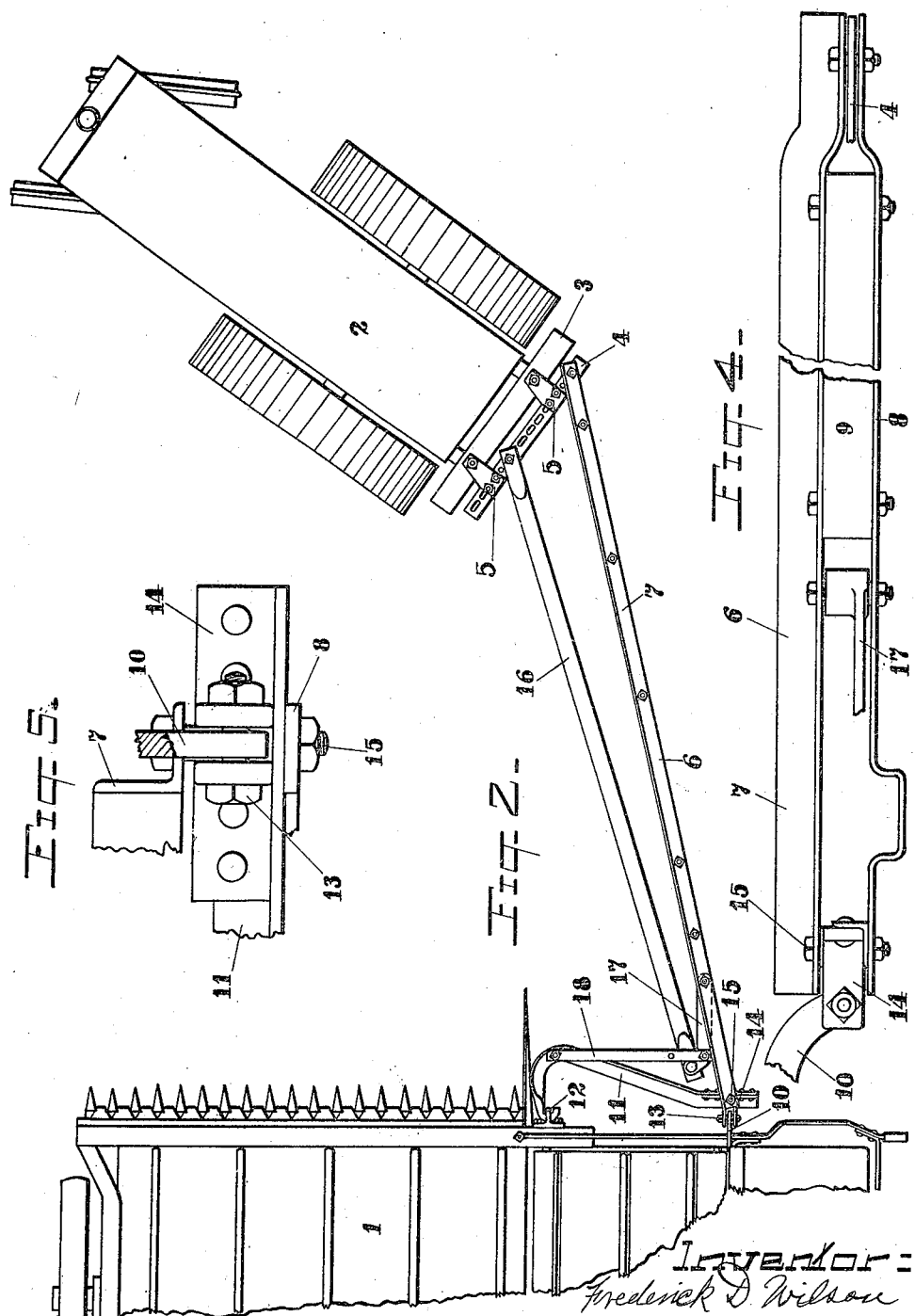

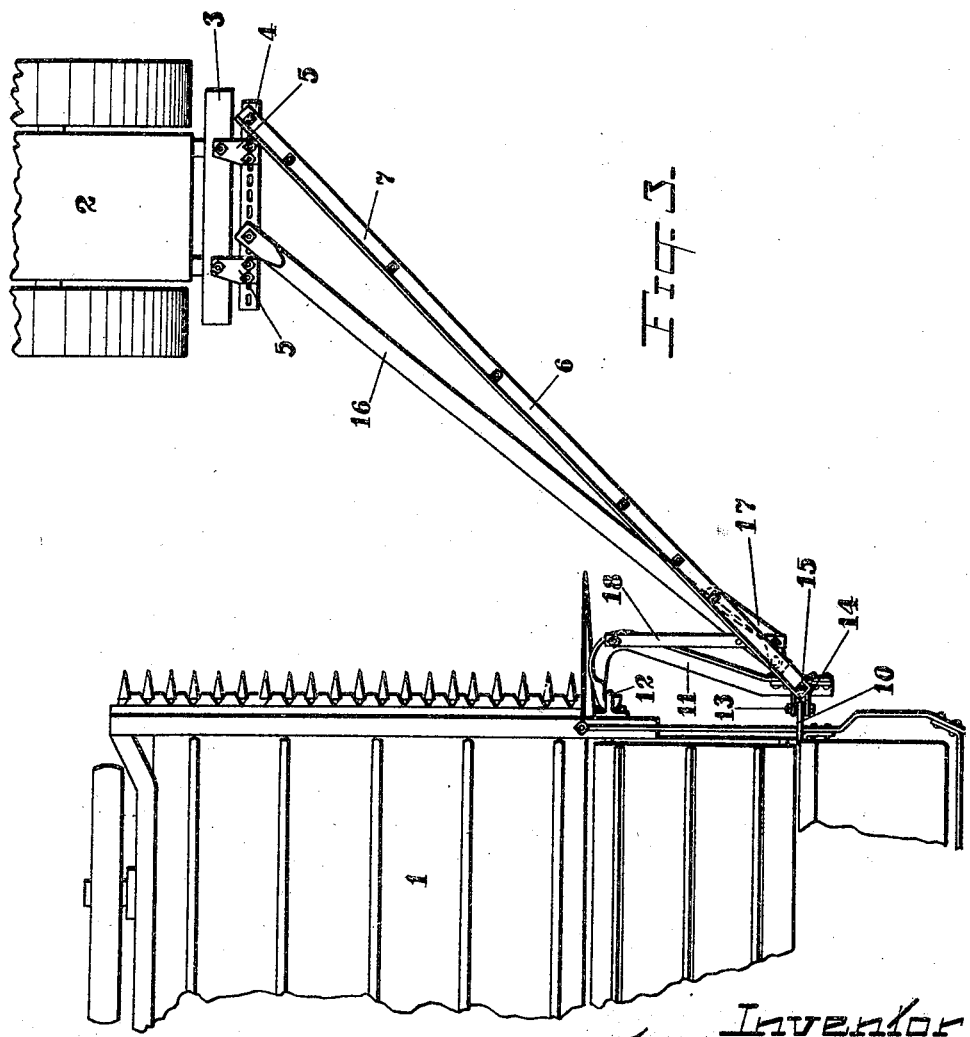

1,497,051

UNITED STATES PATENT OFFICE.

FREDERICK D. WILSON, OF MOLINE, ILLINOIS, ASSIGNOR TO DEERE & COMPANY, OF MOLINE, ILLINOIS, A CORPORATION OF ILLINOIS.

TRACTOR HITCH.

Application filed May 7, 1918, Serial No. 233,087. Renewed August 12, 1921. Serial No. 491,873.

*To all whom it may concern:*

Be it known that I, FREDERICK D. WILSON, a citizen of the United States, residing at Moline, in the county of Rock Island and State of Illinois, have invented certain new and useful Improvements in Tractor Hitches, of which the following is a specification, reference being had therein to the accompanying drawing.

My invention relates to hitching devices employed to connect the draft of a tractor with a harvester and other machinery, but more particularly the former. The object of my invention is to provide a hitch simple and economical in construction, and which is effective in operation, to control the progress of the harvester when moving ahead or in making a turn.

Referring to the drawings in which similar numerals indicate identical parts—

Figure 1 is a plan view of my device connected to the rear of a tractor and the front of a harvester and binder.

Figure 2 is a similar plan view but showing the position of the parts when the tractor is turning to lead the harvester in a direction practically at a right angle to the previous course.

Figure 3 shows the relative position of the tractor and harvester at that point when the latter will turn to follow the tractor.

Figure 4 is an enlarged side elevation of the hitch viewed from the stubbleward side.

Figure 5 is an enlarged detail of one of the hinge connections to the binder, and Figure 6 is an enlarged detail section looking forward on the line 6—6 of Figure 1.

Sufficient of a harvester and binder 1 and of a tractor 2, has been illustrated to clearly define the application of my invention, both machines being shown in Figure 1, in their relative positions when operating in a direct line. Mounted on the rear of the tractor, in any suitable manner, is a bar 3 to which a draw bar 4 is rigidly secured by plates 5 bolted to both bars.

The tractor and the harvester are flexibly connected in the following manner. Pivotally secured to the draw bar 4 is a draft bar 6 formed of an upper angle bar 7 below which, and parallel therewith, is a bar 8 preferably flat. Adding to the rigidity of the reach is a reinforcing block 9 securely bolted between the bars 7 and 8. A bracket 10 is rigidly secured on the harvester frame at a point which is practically in line with the bull wheel of the machine, which is not shown. A member 11 is hooked to an eye 12, secured on the harvester frame adjacent the stubbleward end of the cutter bar, and extends laterally toward the bracket 10 and is pivotally secured thereto by a horizontal bolt or pin 13 which passes through the bifurcated portion of a casting 14 and through the end of the bracket 10 therein. The casting 14 is rigidly mounted on the end of the member 11 and to it the rear end of the draft bar 6 is pivotally secured by a vertical bolt or pin 15.

A draft and steering bar 16, preferably tubular and having both ends flattened, has its forward end pivotally connected to the bar 4, and its rear end pivotally connected to a lever 17 which is pivotally mounted between the bars 7 and 8 of the draft bar 6. The member 11 extends forwardly from its hook end and is then bent rearward and extends toward the bracket 10. To the bend of the member 11 I pivotally connect parallel links 18, one below and the other above the member 11, and extend them to pivotal connection with a rearward bend of the lever 17 adjacent the pivotal connection of the latter with the draft and steering bar 16, and preferably between the draft bar 6 and the draft and steering bar 16.

It is well known that it is the tendency of a harvester to turn grainward when in operation and this side draft is overcome by connecting the drawing power, whether horses or tractor, near to the stubbleward end of the machine, the draft device or connection usually consisting of a tongue secured to the harvester and reinforced by suitable braces.

In my device the draft connection comprises the draft bars 6 and 16 and parts securing them to the tractor and binder as previously explained. Normally when the tractor and binder are traveling straight ahead the draft bars and connecting parts are in position as shown in Figure 1, both bars drawing, the tractor and harvester being offset one from the other, so that the travel of the former is outside the limit of the uncut grain.

In Figure 2 is illustrated a turn of the tractor approximately half completed and the harvester still advancing in a direct line, in this case the action of the draft bar 6 and the draft and steering bar 16 directly opposite the draft bar 6 pulling ahead and the steering bar 16 thrusting rearward to counteract a turning movement of the harvester. As the turning movement of the tractor continues the rear end of the draft bar 6 and the bar 16 approach each other, the latter at the same time moving longitudinally rearward to the limit of the rearward swing of the links 18 and the lever 17. At this limit there is practically no further rearward movement of the draft and steering bar 16, the links 18 and the lever 17, but the rearward thrust of the bar 16 continues, checking the tendency of the harvester to turn with the tractor; the harvester is still being drawn ahead and the rear of the draft bar 6 is still turning and swinging toward the steering bar 16. As the turn of the tractor and the swing of the draft bar 6 continues the latter passes over the rear end of the steering bar 16, the latter moving longitudinally rearward swinging the lever 17 until the lever 17 and the rear end of the steering bar 16 are projecting between the bars 7 and 8 of the draft bar 6, as shown in Figure 3, the bar 8 being bent at this point for the purpose of receiving the joint of the lever 17, the steering bar 16 and the links 18.

At this point the steering bar 16 and the lever 17 are in longitudinal contact and the steering bar 16 is losing its power which, through the links 18, is exerted in a stubbleward direction; the two bars are now acting together as a draft means, although the draft bar 6 carries the greater part of the draft load until the tractor and harvester are again advancing in a straight line. When the position of the parts is as just described the harvester begins to follow the turning movement of the tractor until it is again in position as shown in Figure 1, and the draft connections are as shown therein.

I do not limit the application of my device to a tractor drawn harvester, for it will be equally effective when applied to any agricultural machine or implement, or wheeled bodies pulled by a tractor, where it is desired that a turn shall be short and quickly made.

What I claim is—

1. In a draft and steering connection for harvesters drawn by a tractor, the combination of a draft bar pivotally connected to the harvester and to the tractor, a steering bar pivotally connected to the tractor and extending rearwardly, a lever having one end pivoted on the draft bar and its opposite end pivoted to the rear end of the steering bar, a member extending laterally in front of the harvester and secured thereto, and a link pivotally mounted on the grainward portion of said member and pivotally connected to said lever and in alinement therewith.

2. In a draft and steering connection for harvesters drawn by a tractor, the combination of a draft bar pivotally connected to the harvester and to the tractor, a steering bar pivotally connected to the tractor and extending rearwardly, a lever having one end pivoted on the draft bar and its opposite end portion bent forwardly and its extremity pivotally connected to the rear end of the steering bar, a member extending laterally in front of the harvester and secured thereto, and a link pivotally mounted on the grainward portion of said member and extending toward the lever and in alinement therewith and pivotally connected to said lever at the bend thereof.

3. In a draft and steering connection for harvesters drawn by a tractor, the combination of a draft bar pivotally connected to the harvester and to the tractor, a steering bar pivotally connected to the tractor and extending rearwardly in substantially the same horizontal plane as the draft bar, a member extending laterally in front of the harvester frame and secured thereto, a lever pivoted on the draft bar and extending grainward to pivotal connection with the steering bar, and a link pivotally mounted on the grainward portion of said member and pivotally connected to said lever adjacent the connection thereof with the steering bar.

4. In a draft and steering connection for harvesters drawn by a tractor, the combination of a draft bar pivotally connected to the harvester and to the tractor, a steering bar pivotally connected to the tractor and extending rearwardly in substantially the same horizontal plane as the draft bar, a member extending laterally in front of the harvester frame and secured thereto, a lever pivoted on the draft bar and extending grainward to pivotal connection with the steering bar, and a link pivotally mounted on the grainward portion of said member and pivotally connected to said lever between the ends thereof.

5. In a draft and steering connection for tractors and vehicles drawn thereby, the combination of a draft bar pivotally connected to the tractor and to the vehicle, a draft and steering bar pivotally connected to the tractor and to a flexible connection having its parts in alinement and connected to the vehicle and the draw bar and coacting with the draw bar to draw said vehicle when the tractor is traveling in a direct line and operating with rearward force to hold the vehicle in said direct line when the tractor is turning.

6. In a draft and steering connection for tractors and vehicles drawn thereby, the combination of a draft bar pivotally connected to the tractor and to the vehicle and adapted to swing to follow a turn of the tractor, a lever pivotally attached to the draft bar adjacent the rear pivot of the latter, a link pivotally secured to the vehicle and to the lever, and in alinement with the latter when the tractor and vehicle are traveling in a direct line, a draft and steering bar pivotally attached forwardly to the tractor and its rear end pivotally secured to said lever adjacent the connection of the link therewith and coacting with the draft bar to draw said vehicle when the tractor and vehicle are traveling in a direct line, said steering draft bar having a rearward longitudinal movement when the tractor turns, and the swing of the draft bar and rearward motion of the steering draft bar angling the link and lever rearwardly whereby said bars are drawn together rearwardly and the rearward force of the steering draft bar operates to hold the vehicle in said direct line until the turn of the tractor is completed.

FREDERICK D. WILSON.